(No Model.)

A. JOHNSON.
HORSE HITCH.

No. 481,231. Patented Aug. 23, 1892.

Witnesses.

Inventor.
Albert Johnson
by Edwin Bearla
attorney

UNITED STATES PATENT OFFICE.

ALBERT JOHNSON, OF HAVERHILL, MASSACHUSETTS, ASSIGNOR OF ONE-HALF TO FRANK H. DUNMORE, OF SAME PLACE.

HORSE-HITCH.

SPECIFICATION forming part of Letters Patent No. 481,231, dated August 23, 1892.

Application filed March 8, 1892. Serial No. 424,132. (No model.)

*To all whom it may concern:*

Be it known that I, ALBERT JOHNSON, a citizen of the United States, residing at Haverhill, in the county of Essex and State of Massachusetts, have invented certain new and useful Improvements in Horse-Hitches, of which the following, taken in connection with the accompanying drawings, is a specification.

The object of my invention is to produce a hitch for horses whereby they can be readily secured and released.

The invention consists of a block having an opening or aperture in which is secured a spindle, upon which is mounted a toothed cam and also a toothed or corrugated wedge-shaped sliding piece, so that when a strap or rope is passed between them it can be easily drawn in one direction, but when drawn in the opposite direction will be firmly held between the wedge-shaped piece and the toothed cam, as hereinafter fully described and pointed out in the claim.

Figure 1:
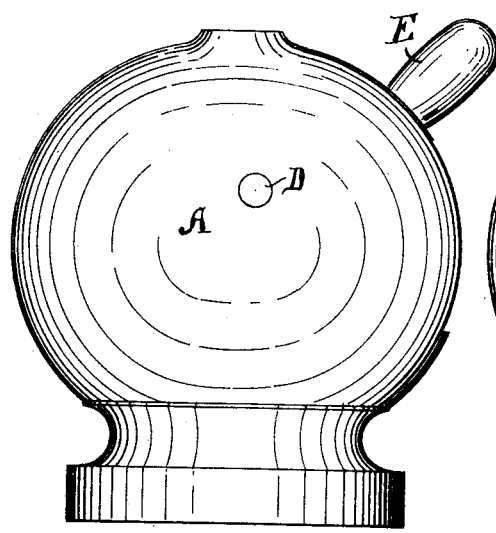
Figure 2:
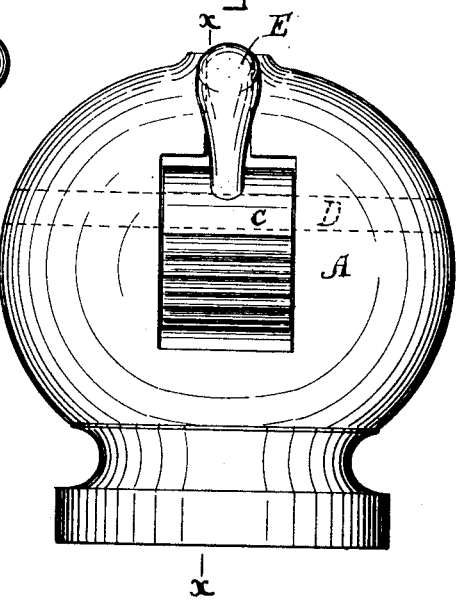
Figure 3:
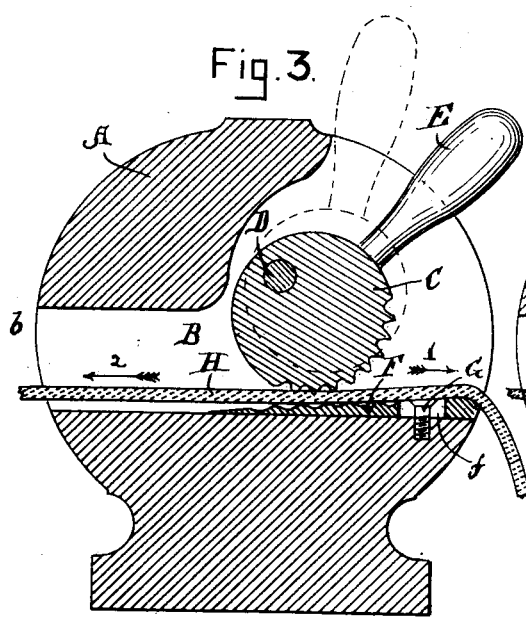
Figure 4:
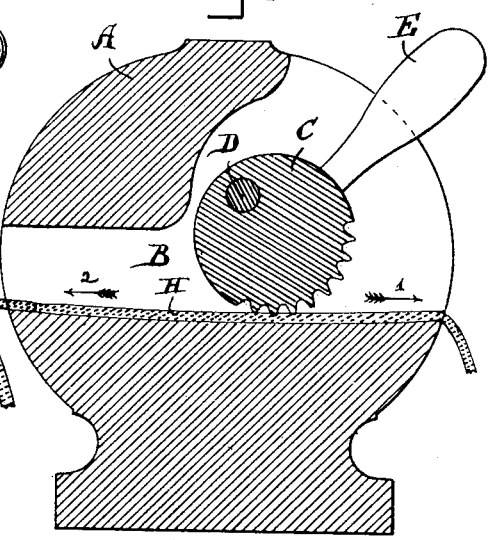

Referring to the accompanying drawings, Figure 1 represents a side view of a horse-hitch embodying my invention. Fig. 2 is a view of the rear or that part opposite to which the rope or strap is inserted. Fig. 3 is a vertical section taken on line $x\,x$ of Fig. 2. Fig. 4 is a vertical section view of a modification.

A represents a block, the contour of which is preferably globular, as shown. Through this block extends an opening or aperture B, which at its rear portion is enlarged so as to admit a toothed cam C, that is mounted upon a spindle D, that passes through the block. The upper portion of the aperture B in the rear is only wide enough to allow of the free passage of a handle E formed in one with or secured to the cam C.

F is a wedge-shaped piece corrugated or toothed on its upper surface. This piece is of the same width as the cam C, and is held in place by a screw G, passing through a small slot $f$ in the rear end of the wedge-shaped piece F, so that while it is held down it is still free to travel a short distance horizontally.

H, Fig. 3, represents a piece of strap inserted and held by the hitch, the strap having been inserted from the front $b$ between the toothed cam C and the toothed or corrugated wedge F. It will be seen that as the strap passes between the cam C and wedge F that if it is pulled in the direction of the arrow 1 no resistance will be offered by them and it can be drawn upon as much as desired; but when drawn in the direction of the arrow 2 the wedge F is caused to slide and the teeth of the cam C press upon the upper portion of the strap, so that the more strain applied the greater will be the grip upon the strap. When it is desired to release the strap, the handle E is raised to the position shown in dotted lines in Fig. 3 and the strap is free to be drawn out.

Although I prefer to employ the sliding wedge-piece F the hitch might be constructed without it, as shown in Fig. 4, which is a vertical section of this modified arrangement, the construction and operation being the same with the exception that instead of the wedge F the bottom of the opening is formed slightly rounding, as shown.

The hitch may be secured to a post or formed in one with it or be secured to any convenient object, and although I have shown the block of globular form, and which I prefer, it of course could be of any other desired form.

What I claim is—

A horse-hitch consisting of a block having a suitable opening or aperture through it, a corrugated sliding wedge resting on the bottom of said opening, and a toothed eccentric having a handle and fulcrumed upon a spindle passing through said opening above the sliding wedge, substantially as set forth.

In testimony whereof I have signed my name to this specification in the presence of two subscribing witnesses.

ALBERT JOHNSON.

Witnesses:
CHAS. STEERE,
EDWIN PLANTA.